(12) United States Patent
Fang et al.

(10) Patent No.: US 12,149,641 B2
(45) Date of Patent: Nov. 19, 2024

(54) CIRCUIT APPARATUS AND METHODS FOR PUF SOURCE AND GENERATING RANDOM DIGITAL SEQUENCE

(71) Applicant: INTELLIGENT INFORMATION SECURITY TECHNOLOGY INC., Hsinchu (TW)

(72) Inventors: Wai-Chi Fang, Hsinchu (TW); Nicolas Jean Roger Fahier, Hsinchu (TW); Hao-Ting Lin, Hsinchu (TW); Yu-Jun Yang, Hsinchu (TW)

(73) Assignee: INTELLIGENT INFORMATION SECURITY TECHNOLOGY INC., Hsinchu (TW)

( * ) Notice: Subject to any disclaimer, the term of this patent is extended or adjusted under 35 U.S.C. 154(b) by 430 days.

(21) Appl. No.: 17/518,765

(22) Filed: Nov. 4, 2021

(65) Prior Publication Data
US 2023/0139712 A1    May 4, 2023

(51) Int. Cl.
*H04L 9/32* (2006.01)
*G06F 7/58* (2006.01)
*H03K 19/17768* (2020.01)

(52) U.S. Cl.
CPC ........... *H04L 9/3278* (2013.01); *G06F 7/588* (2013.01); *H03K 19/17768* (2013.01)

(58) Field of Classification Search
CPC . H04L 9/3278; H04L 9/0869; H04L 2209/12; H04L 9/0866; G06F 7/588; H03K 19/17768
See application file for complete search history.

(56) References Cited

U.S. PATENT DOCUMENTS

| | | | |
|---|---|---|---|
| 9,792,089 B2 | 10/2017 | Yu et al. | |
| 10,432,198 B1 | 10/2019 | Wang et al. | |
| 10,691,414 B2 * | 6/2020 | Wu | H04L 9/3278 |
| 2016/0267266 A1 | 9/2016 | Yamamoto et al. | |
| 2018/0176025 A1 * | 6/2018 | Suresh | H04L 9/3278 |
| 2019/0305970 A1 | 10/2019 | Satpathy et al. | |
| 2020/0099542 A1 | 3/2020 | Vasyltsov et al. | |

(Continued)

FOREIGN PATENT DOCUMENTS

WO    WO-2018145755 A1 *    8/2018    ............. G06F 7/588

OTHER PUBLICATIONS

Xinyu Wang et al., High Throughput Portable True Random Number Generator Based on Jitter Latch Structure, IEEE Transactions On Circuits and Systems—I: Regular Papers, vol. 68, No. 2, 2021.

(Continued)

*Primary Examiner* — Mohammed Waliullah
(74) *Attorney, Agent, or Firm* — Locke Lord LLP; Tim Tingkang Xia, Esq.

(57) ABSTRACT

A triggerable circuitry for a Physically Unclonable Function (PUF) source and true random number generator comprises an array of metastable latches PUF cells units that produce output states in racing configuration dependent on manufacturing variations and noise fed into a counting circuit. The technology as a single circuit extracts detected random bits' states for true random numbers generation, different each time when requested, and is able to feed a PUF recovery system that will use the fairly static bits' patterns of the measured circuit although each time different.

22 Claims, 8 Drawing Sheets

(56) References Cited

U.S. PATENT DOCUMENTS

2020/0136840 A1* 4/2020 Lee .................... G06F 21/73
2021/0399905 A1* 12/2021 Kwak .................. G06F 21/75

OTHER PUBLICATIONS

Naoya Torii et al., ASIC implementation of random number generators using SR latches and its evaluation, EURASIP Journal on Information Security (2016) 2016:10.

Pietro Nannipieri et al., True Random No. Generator Based on Fibonacci-Galois Ring Cscillators for FPGA, applied sciences, 2021, 11, 3330.

Naoki Fujieda et al., A light weight implementation of latch based true random number generator, 2019 IEEE, 901-906.

* cited by examiner

CIRCUIT APPARATUS AND METHODS FOR PUF SOURCE AND GENERATING RANDOM DIGITAL SEQUENCE

BACKGROUND OF THE INVENTION

Field of the Invention

The present invention relates to a random number generator, and in particular to a circuit and method for the generation of true random numbers and Physically Unclonable Function (PUF) entropy source based on hardware circuitry for embedded system security.

Description of the Prior Art

Conventional techniques used in prior art (PA) are essentially based on creating a true random number from semiconductor manufacturing variation during a onetime operation, typically the power up cycle, before being used a true random seed for continuous computation of true random numbers or before being used as a single random ID for the device.

In the case of creating a single identity (ID), the apparatus and methods in PA use an additional error correcting circuit or metastable bits' removal circuit to guarantee the successful recovery of the unique device attached digital sequence.

A major defect of the prior art comes from the absence of ability to dynamically call out or trigger the source of the digital sequence randomness.

Also, without tolerance to errors when measuring random Physically Unclonable Function (PUF) cell states, the system is hardly reliable for the long-term when its purpose is to deliver a fixed unclonable ID.

Moreover, techniques based on voltage bias and memories are depending on power-up cycle and are executed one time, so the result of the PUF circuitry is a used as a root seed but not directly as a random number for private keys or not retrieved on-demand in the case of unique ID.

In order to overcome the disadvantages of the prior art, it is necessary to design a PUF circuitry that can be both source of true random number and source of PUF, with both static and dynamic entropy, and that can be requested dynamically independently from programming, fixed bias or power-up cycle.

SUMMARY OF THE INVENTION

In view of this, the present invention provides circuitry and methods for the generation of true random number and Physically Unclonable Function (PUF) entropy source based on hardware circuitry for embedded system security. The ability to generate unpredictable true random numbers is one of the pillars to guarantee robust cybersecurity deployment, essentially in the ability to obtain true random digital signatures, digital credentials for encryption keys. In addition, the ability to create a random source of entropy with enough static behavior to retrieve a unique device's attached digital signature is another pillar of cybersecurity deployment.

The present invention has the objective of serving both the generation of true random numbers and PUF entropy source, and relates to cryptographic systems providing unique credentials as device inherent digital sequences.

Another objective of the present invention is to provide a circuit apparatus that generates any size of true random numbers on-demand independently from voltage bias, power-up cycles, or pseudo-random number generator algorithms, and that can be as well the input source of a PUF system.

In other words, the present invention is intended to be part of a Physically Unclonable Function circuitry as true randomizer of unique recoverable IDs, but as well as a separated true random number source.

An advantage of the present invention is that the present invention utilizes a one circuitry design for PUF source and generation of true random numbers.

Another advantage of the present invention is that the present invention is dynamically triggered on-demand, is only dependent on a trigger signal, and does not require a specific starting procedure.

The present invention provides PUF source and random number outputs that can be measured and collected at will without the need to buffer any results to be used as seed of another system.

In the present invention true random numbers are not used as a seed of a pseudo-random generator.

The presented circuitry exhibits enough static entropy and statistics to be used as a reliable PUF source given the use of an additional PUF algorithm such as Error-Correcting Coding or Curve Cryptography.

The circuit of the present invention is entirely digital based on logic gates and can be manufactured under a single process node technology.

The present disclosure provides systems and methods for obtaining a reliable physically unclonable function (PUF) data input source while using the same measured data from the disclosed systems to also generate true random bits digital sequence. In embodiments, the PUF source input corresponds to the output of the states counter and collector circuits of accumulated counts from the measured PUF cell units' states.

In embodiments, the PUF source input is not filtered or pre-processed before being used to extract a set of random bits from it. The principle behind the present invention is its ability to provide a reliable source of a PUF algorithm while being a sufficient source of randomness that resides in the reality that even though each PUF cell unit, no matter which structure whether memory-based or not, is designed to be perfectly balanced between throwing 1 or 0 as output through time, and is actually more likely to be statistically biased to one value more than the other after repeated triggered measurements.

However, a statistically tendency to be throwing out one value more than the other is accompanied by different actual throw count number of each state, 0 or 1. Therefore, from a circuit source of randomness, given the ability to trigger a value out of any cell at any moment, the present invention is able to use the same resulted PUF cell units states count array for both generating random numbers using the oscillating value's least significant bits and as raw input of a PUF algorithm able to converge toward a unique digital PUF identity or digital sequence.

The disclosed invention finds its applications within the establishment of security credentials between electronics devices. The current recommended cybersecurity practices require both true random number generators and unique intrinsic digital identities which the disclosed invention provides a reliable source for both these functions implementations on integrated circuits. Unique digital sequences are used for authentication mechanisms and key exchanges algorithms and true random numbers used for random hash salt and private encryption keys establishments. The aforementioned cipher algorithms and secure mechanisms that are used in every secure channel establishment between devices and the potential applications of this invention are broad, for example FIDO authentications, point-to-point encryptions, crypto wallets, self-encrypted memories, secure processor units or encryption keys management systems.

DESCRIPTION OF THE PREFERRED EMBODIMENTS

Figure 1:
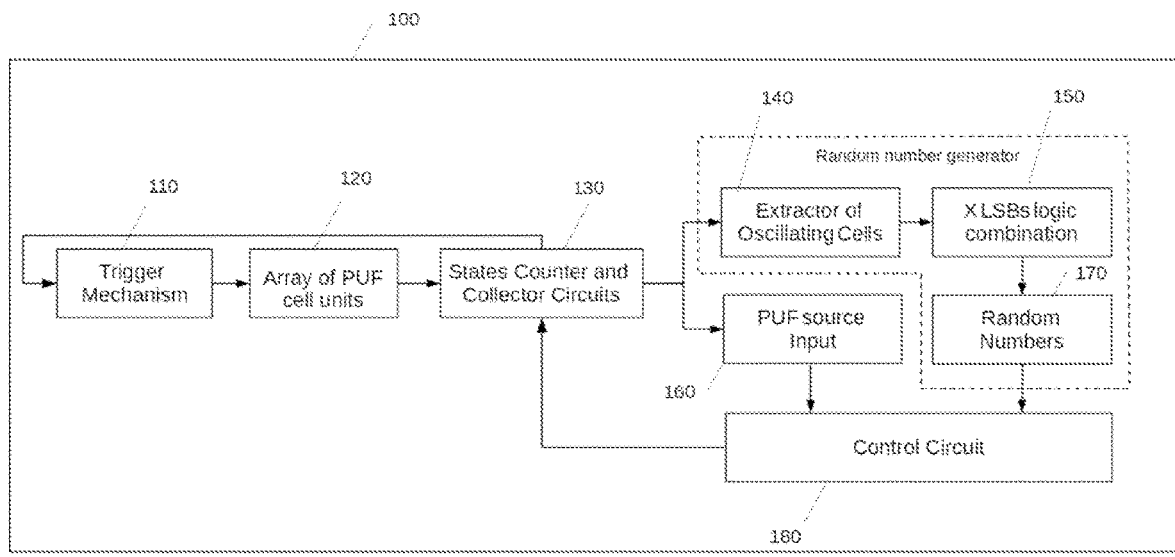
FIG. 1 is a drawing illustrating a system for generating both a reliable physically unclonable function input source and a true random number generator based on a single array of PUF cell units excited and measured on active trigger mechanism according to an embodiment of the present invention.

In order to make the purpose, technical solutions, and advantages of this application clearer, the application will be further described in detail below with reference to the drawings and embodiments. It should be understood that the specific embodiments described here are only used to explain the present application, and are not used to limit the present application.

The present disclosure describes an electronic circuitry and system capable of being solely based on CMOS logic gates implementation and design to create a statistical logic outputs array that incorporates adequate static entropy to be the input entropy source of Physically Unclonable Function (PUF) and as well adequate dynamic entropy to be a source of a true random number generator without additional assistance of pseudo-random generator system.

The design and integration of a good entropy source for a PUF is one of the challenges and needs for any electronic system or network of electronic system concerned by cybersecurity issues. A PUF integrated into an electronic system gives it the advantage of being able to source unique digital identities and behavior based on intrinsic unique semiconductor variations features.

The main goal of a PUF system is to retrieve a unique static digital sequence, used as a root digital identity, from a source of randomness, or source of entropy, that will inhibit any possible prediction while giving suitable input for a PUF system to use it and extract from it a unique digital sequence and random numbers.

In the deployment of cybersecurity systems, security protocols and mechanism are all based on a certain standardized cipher suite usually composed of a key exchange algorithm, authentication algorithm, encryption and message authentication code algorithm, such as ECDH, ECDSA, AES, RSA, SHA but not limited to.

An integrated PUF system mechanism able to retrieve a digital unique sequence intrinsic to a single silicon manufactured system, will be able to source these algorithms and security protocols with unpredictable unique sequences, never known by the manufacturer, the designer or the user, which already prevents database cyberattacks that currently have these unique identifiers required to be stored and set by human or machine fixed intervention.

Intrinsic retrievable unique digital identities can be used for authentication mechanisms, network identifications or input bias for message authentication algorithms, usually referred as salt. Indeed, the required cipher suite to deploy secure electronic environment are standardized and fixed, therefore electronics designers are required to implement uniqueness manually or intrinsically with PUF to render the behavior of these standards unique.

Moreover, cipher suite algorithms at the exception of hash algorithm are composed of symmetrical and asymmetrical encryption mechanism which imply the creation of encryptions keys.

In the case of key exchange algorithms and authentication algorithms, used in every messaging application, remote connection, network connection, network identification, messages authentications and digital certificates and authentications, a public encryption key will be derived from a private encryption key which is sourced by a random number generator.

In the case of symmetrical encryption algorithm, a shared encryption key will be safely exchanged and also sourced and created by a true random number generator. Therefore, a PUF system retrieving a unique digital identity, even though more challenging, is almost as important as having a reliable and no-predictable true random numbers generator system.

In this disclosed invention, a dynamic system to provide a source of entropy for both PUF mechanism and random number generator is described and integrated with a single semiconductor CMOS technology. The disclosed system is able to provide the source of entropy to the target systems independently from the electronic device power-up cycle. The current state-of-the art in terms of system able to provide unique digital identity with a PUF as well as random numbers are based on a one-time operation during power-up cycle or single triggered enrollment sequence. While the retrieval of a unique digital identity could only rely on a single time operation, the creation of random numbers must rely on extra pseudo-random algorithms to generate true random numbers, not being able to dynamically reuse their source of entropy.

The uniqueness and strength of the present invention resides in its ability to be used and reused independently from any other systems or power-up sequence, by consequence without causing design restrictions for the host electronic system of this invention. The design of the present invention only requires a single semiconductor CMOS process manufacturing and can be integrated within any standard processor units (CPU, MCU, GPU) or custom ASIC systems without additional design costs, as a plug and design integrated subsystem.

In addition to the simplicity and low-cost integration capability of a dynamic entropy source relying on a single semiconductor process, the dynamic feature of the present invention makes it able to be an independent subsystem which means that combined with a PUF system retrieval code system, it can be part of a physical independent integrated circuit that can be integrated into existing electronic devices without the need to modify the intrinsic design of processor units using it and drastically cutting the cost of now avoidable new integrated circuits designs, notably CPUs, MCUs and GPUs.

Traditional PUF cell units are designed using various type of circuits, SRAM unit, MRAM units, Fuse transistors, OTP or other non-volatile memory structures for memory-based PUF cells, but also based on looped logic gates circuits with uncertain output states, mostly latches-based.

The memory-based PUF cell units in general rely on a random initial state value when powered-up, random state value that is randomized by semiconductor manufacturing nanoscale variations.

The logic-based PUF cell units do not necessarily depend on a random power-up state but similarly to memory-based PUF cell unit will rely on semiconductor manufacturing nanoscale variations to have their output state randomized by having randomized layout density, layout path, parasitic, timing characteristics or other related manufacturing non-predictable layout rendering and characteristics.

A PUF cell unit is seldom used alone and is usually combined to other identical PUF cell unit to form a structure that will have unpredictable digital values outputs. The PUF cell unit structure is commonly designed in the form of an array of A columns and B rows with defined connection and interactions between each cells, input trigger and state out measurement circuits.

An array of PUF cells units can therefore be used for both purposes of recovering or retrieving a fixed unique corresponding digital sequence and generating random numbers, more precisely random bits.

However, in a PUF system aiming at recovering a fixed unique sequence it is ideal to have a random digital result that is truly random and unique to each PUF cells array but that actually does not vary or vary too much in time so the fixed unique corresponding digital sequence stays reliable and unchanged.

On the other hand, a true random number generator will prefer and be more efficient with a PUF cells array varying as much as possible in time.

Getting a reliable array of PUF cell units measured results that can serve both purposes requires the array of PUF cell units results to have a good balance between its static entropy and its dynamic entropy, dynamic enough to be unique and provide true random numbers but static enough to guarantee a successful retrieval of a unique digital sequence or identity.

Indeed, in cybersecurity practices and systems it is essential to have reliable source of true random numbers for nonce or private keys generation but as well to have reliable unique identity for device recognition and authentication.

Refer to FIG. 1, which is a drawing illustrating a system for generating both a reliable physically unclonable function input source and a true random number generator based on a single array of PUF cell units excited and measured on active trigger mechanism according to an embodiment of the present invention.

The system and circuit design 100 of FIG. 1 comprises a trigger mechanism 110, an array of PUF cell units 120, a counter and a collector circuits 130, an extractor of oscillating cell 140, an X least significant bits (LSBs) logic combination 150, a usable PUF source input 160, random numbers 170, and a control circuit 180.

The embodiment illustrated in FIG. 1 comprises a system and circuit design 100 that provide a reliable source of PUF unique digital sequence retrieval system, PUF source input, and also a reliable source of a true random number generator, based on a single array of PUF cell units. The control circuit 180 in FIG. 1 refers to any type of control of the flow that can take the form of circuit and hardware integration, software integration or a mix of both depending on the host target system of this invention. The states counter and collector circuits 130 in FIG. 1 refers to an integrated circuit that will handle a trigger mechanism 110 to obtain a target section output result from the array of PUF cell units 120. After measuring the output of the triggered target section of the array of PUF cell units 120, the PUF cell unit's states will be counted and recorded to obtain a statistical table of repeated PUF cell unit's states measurements. The final accumulated counted states array, statistical logic outputs array, can be used as input of a PUF recovering secret algorithm, PUF source input 160, and processed to extract random bits from it through a random number generator. The extraction of random bits from the statistical logic outputs array results rely on a certain amount of least significant bit (LSB) from the PUF cell unit's states count that will present oscillating results after repeated measurements.

Figure 2A:
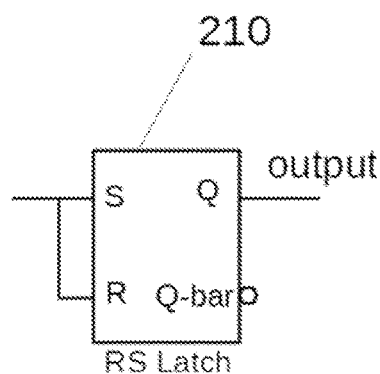
FIG. 2A is a drawing illustrating a symbol representation of a single PUF cell unit design option, a set reset latch (RS-latch) with connected set and reset signals and the latch forward output Q used as PUF cell output according to an embodiment of the present invention.
Figure 2B:
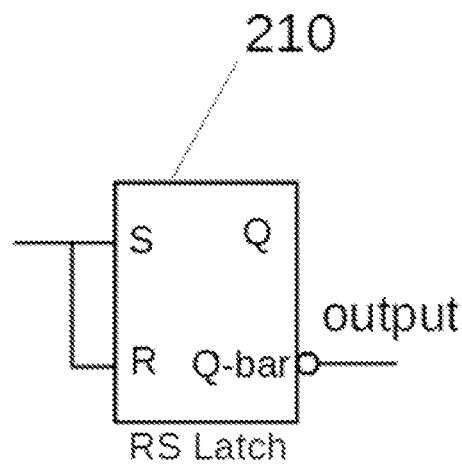
FIG. 2B is a drawing illustrating a symbol representation of a single PUF cell unit design option, the same design as FIG. 2A but using the inverse RS-latch output Q-bar used as PUF cell output according to an embodiment of the present invention.
Figure 4:
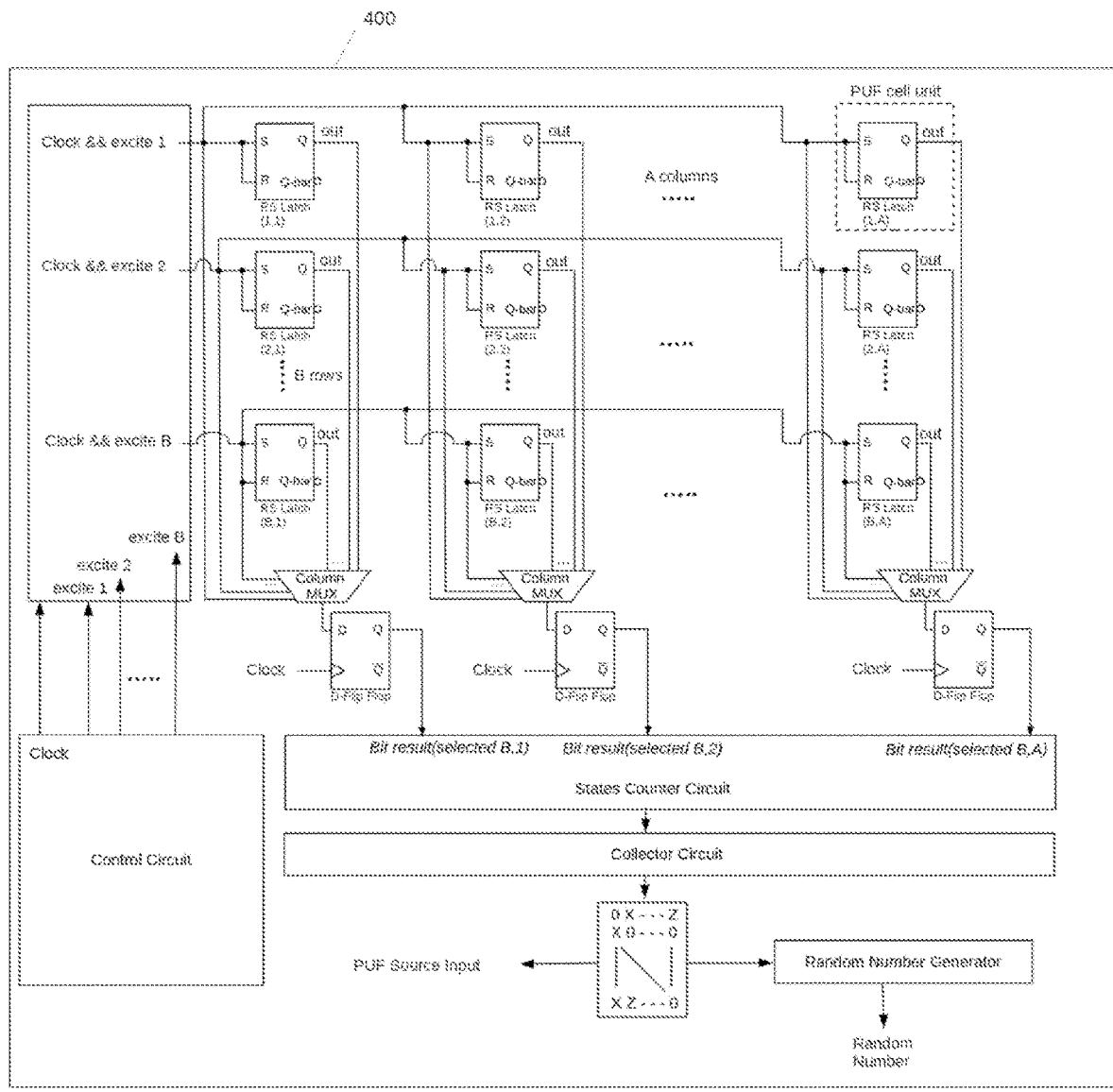
FIG. 4 is a drawing illustrating the circuit architecture of the system of FIG. 1 in accordance with the various invention possible implementations. The PUF cell units of the array of PUF cell units are designed as in FIG. 3A, FIG. 3B, FIG. 3C, FIG. 3D, FIG. 3E or FIG. 3F and represented by the symbol of FIG. 2A that can be changed to its inverted counterpart FIG. 2B according to an embodiment of the present invention.

Refer to FIG. 2A, which is a drawing illustrating a symbol representation of a single PUF cell unit design option, a set reset latch (RS-Latch) 210 with connected set and reset signals and the RS-latch forward output Q, referred as out, used as PUF cell output according to an embodiment of the present invention, to FIG. 2B, which is a drawing illustrating a symbol representation of a single PUF cell unit design option, the same design as FIG. 2A but using the inverse RS-latch 210 output Q-bar used as PUF cell output according to an embodiment of the present invention, and to FIG. 4, which is a drawing illustrating the circuit architecture of the system 400 of FIG. 1 in accordance with the various invention possible implementations.

The PUF cell units are organized in an array, FIG. 4, and are designed as RS-latches 210 with both set and reset signals connected to a single trigger input, FIG. 2A and FIG. 2B. With both set and reset signals wired together and no initial set output values for each NAND or NOR gates, the RS-latch 210 will become a metastable cell with unpredictable output in response to a pulse signal on the set/reset connection.

The output used as PUF cell unit output random state can be either the non-inverted Q output or the inverted one Q-bar. In certain embodiments where FIG. 2A is used in a system, it can always be changed into its inverted version FIG. 2B, both structures are covered and valid for this invention.

Figure 3A:
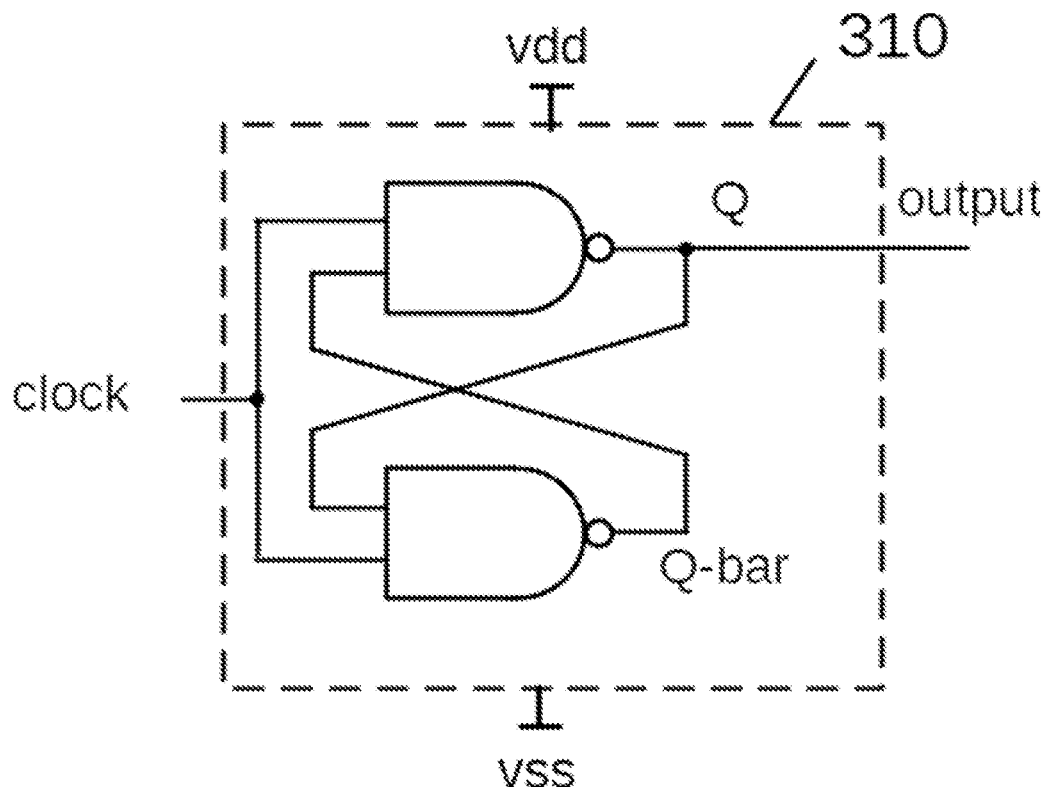
FIG. 3A is a drawing illustrating a PUF cell unit design of FIG. 2A or 2B using two NAND gates according to an embodiment of the present invention.
Figure 3B:
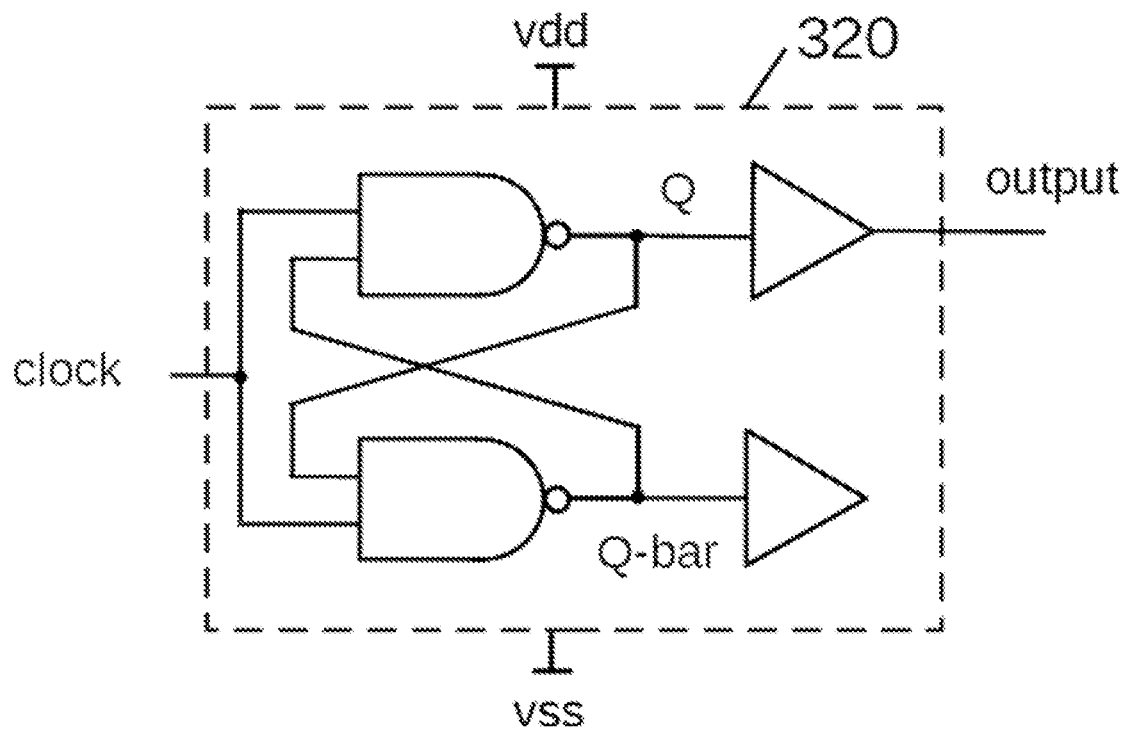
FIG. 3B is a drawing illustrating a PUF cell unit design of FIG. 2A or 2B using two NAND gates and two BUFFER gates according to an embodiment of the present invention.
Figure 3C:
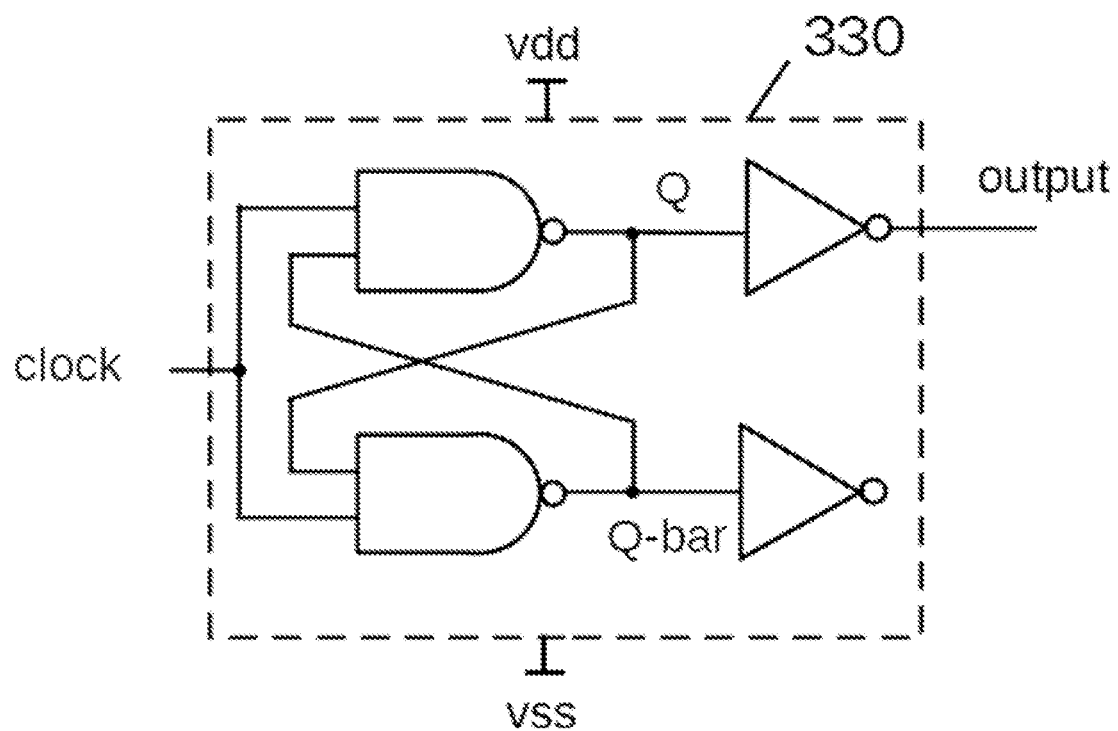
FIG. 3C is a drawing illustrating a PUF cell unit design of FIG. 2A or 2B using two NAND gates and two BUFFER INVERTER gates according to an embodiment of the present invention.

Refer to FIG. 3A, which is a drawing illustrating a PUF cell unit design 310 of FIG. 2A or 2B using two NAND gates according to an embodiment of the present invention, to FIG. 3B, which is a drawing illustrating a PUF cell unit design 320 of FIG. 2A or 2B using two NAND gates and two BUFFER gates according to an embodiment of the present invention, and to FIG. 3C, which is a drawing illustrating a PUF cell unit design 330 of FIG. 2A or 2B using two NAND gates and two BUFFER INVERTER gates according to an embodiment of the present invention.

The design of each PUF cell unit may be as described in FIG. 3A, FIG. 3B, FIG. 3C using NAND gates and a balanced butterfly structure with both available output Q and Q-bar. These NAND-based butterfly RS-latch do not differ from the standard NAND-based RS-latch structures with the exception that both set and reset signal are connected to a single clock signal, also referred to as a trigger. Each RS-latch is supplied with the potential differential voltage vdd-vss and their respective balanced design should be made within the dotted squares. A BUFFER or a BUFFER INVERTER can be added on the output of the RS-latch as part of the design for stability purposes in certain cases of circuit designs, enhancing load circuit symmetry between Q and Q-bar.

Figure 3D:
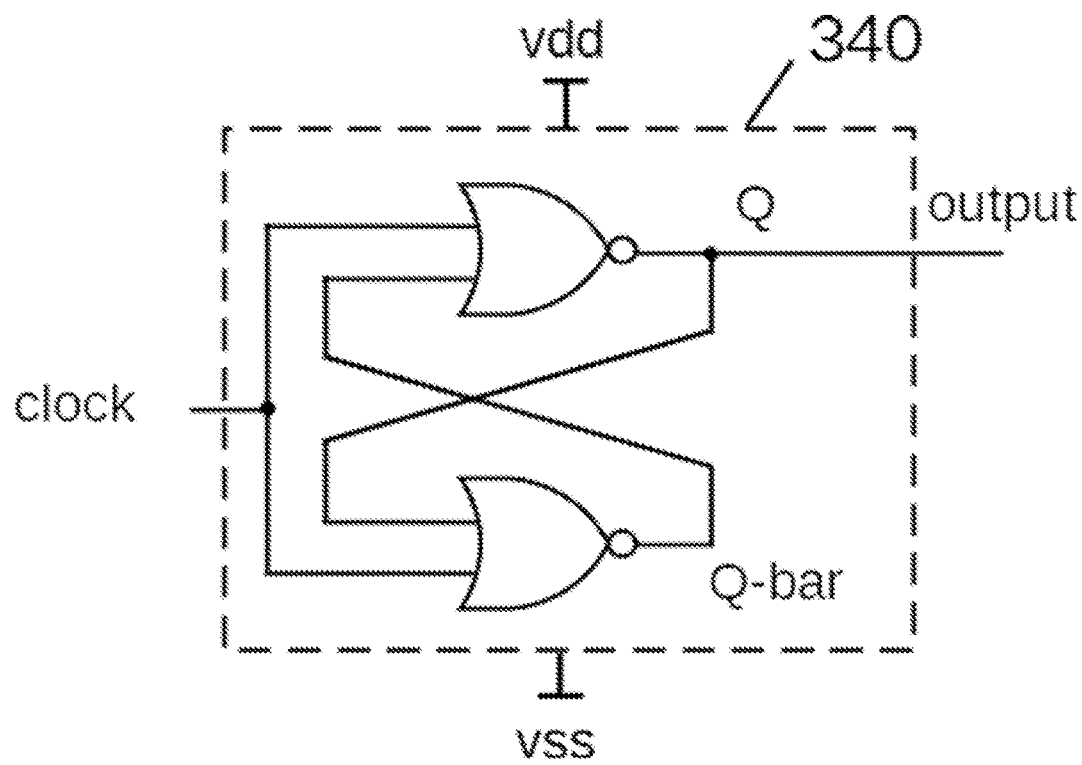
FIG. 3D is a drawing illustrating a PUF cell unit design of FIG. 2A or 2B using two NOR gates according to an embodiment of the present invention.
Figure 3E:
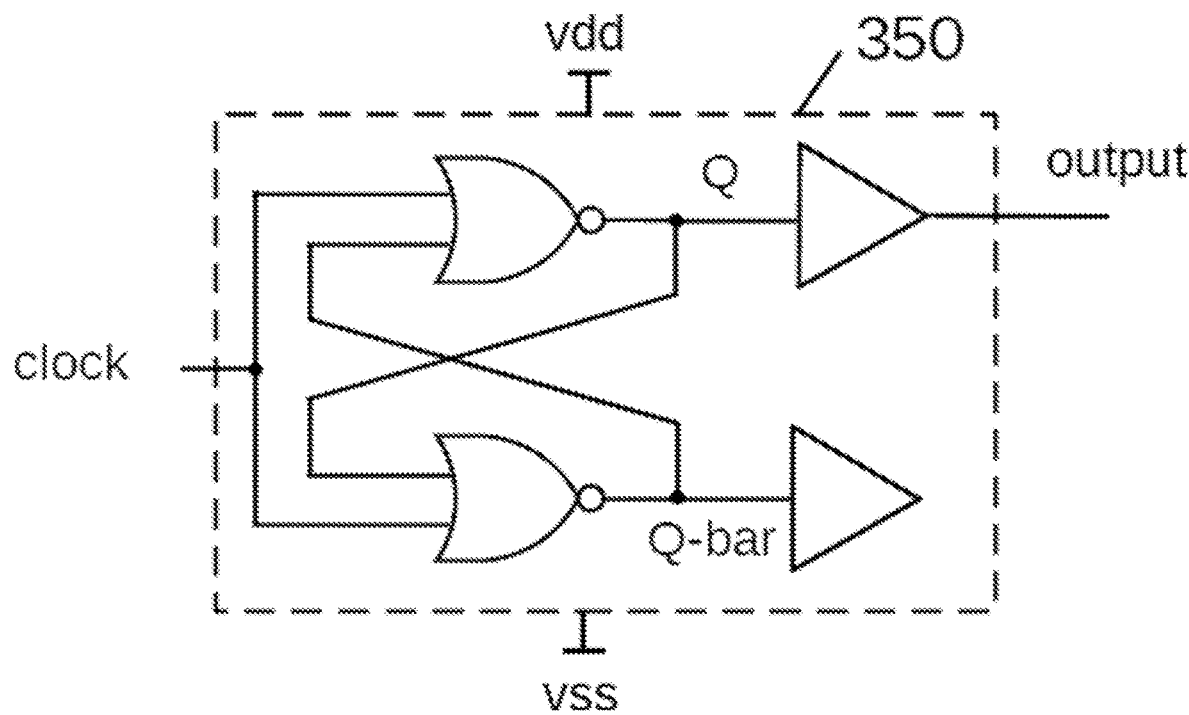
FIG. 3E is a drawing illustrating a PUF cell unit design of FIG. 2A or 2B using two NOR gates and two BUFFER gates according to an embodiment of the present invention.
Figure 3F:
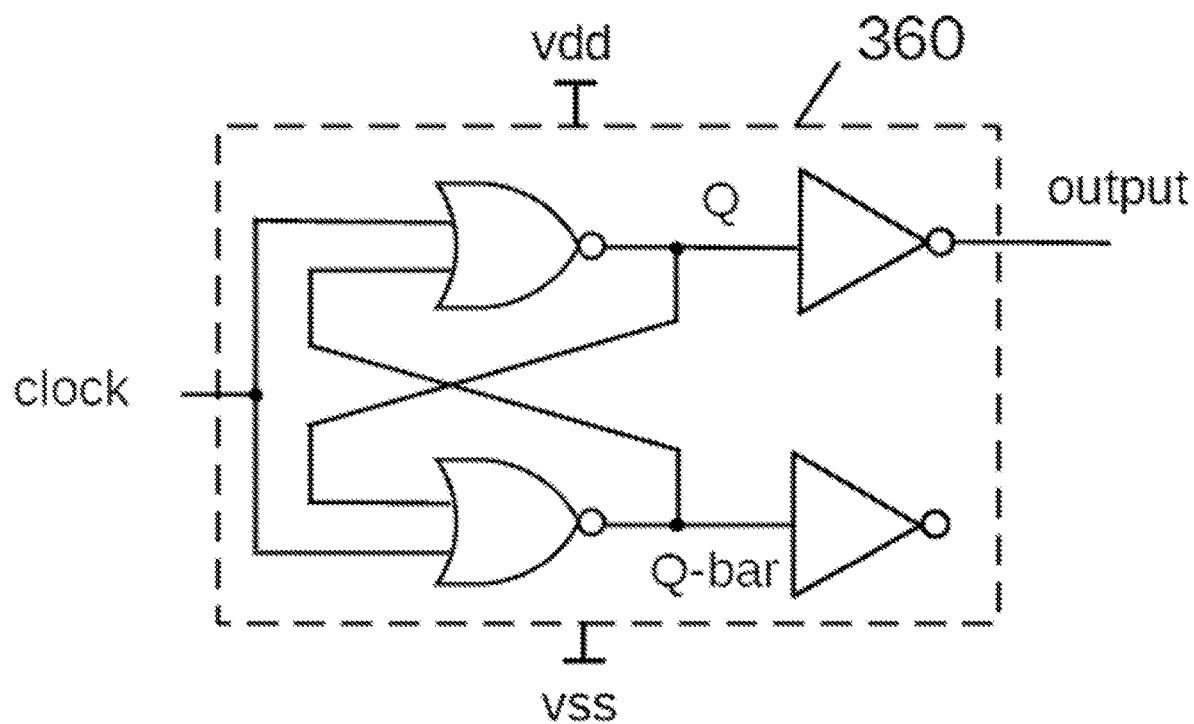
FIG. 3F is a drawing illustrating a PUF cell unit design of FIG. 2A or 2B using two NOR gates and two BUFFER INVERTER gates according to an embodiment of the present invention.

Refer to FIG. 3D, which is a drawing illustrating a PUF cell unit design 340 of FIG. 2A or 2B using two NOR gates according to an embodiment of the present invention, to FIG. 3E, which is a drawing illustrating a PUF cell unit design 350 of FIG. 2A or 2B using two NOR gates and two BUFFER gates according to an embodiment of the present invention, and to FIG. 3F, which is a drawing illustrating a PUF cell unit design 360 of FIG. 2A or 2B using two NOR gates and two BUFFER INVERTER gates according to an embodiment of the present invention.

Similarly, the design of a PUF cell unit may be as described in FIG. 3D, FIG. 3E and FIG. 3F using NOR gates instead of NAND gates and are bound to the same design rules of NAND-gates based butterfly RS-latches.

As previously mentioned, in order to obtain certain metastability and a 50% probability of throwing out a bit state high or low after manufacturing, each RS-latch embodiment needs to be designed with an inner structure as symmetrical as possible. Each path and wire in the circuit layout has to be designed in a way that the metal layers used, wire length and width and parasitic has its symmetrical counterpart for both NAND or NOR gates composing the RS-latch.

Both cross butterfly paths shall be designed physically symmetrical in the layout, the unused outputs Q or Q-bar in the array of PUF cell units shall not be removed in order to ensure symmetry, the input set and reset shall be equally distanced from the trigger or clock input as well as each NAND or NOR gate showing the same mirrored layout characteristics as the other one within the PUF cell unit. In the case of use of BUFFER and BUFFER INVERTER, buffers are also bound to the same requirement of balanced layout design to keep the equal probability of metastable states. The global design of each PUF cell unit regardless of the actual standard RS-latch design should be designed respecting a reflective symmetrical layout according to the cross path butterfly point and line reference, as a mirrored symmetry in between the two repeated entity parts of the RS-latch.

After manufacturing, each PUF cell will actually in most cases tend to be more biased to one state as an ideal 50% metastable probability remains an unreachable theory.

The presented invention relies on this non-ideal metastability of each PUF cell unit so to be able to assess which constant bias state rules each PUF cell unit for creating a PUF source input but as well use the random non-exact repeated measurements to extract random bits and therefore random numbers.

On each of the possible PUF cell unit design in FIG. 3A, B, C, D, E, F, the output signal wire for PUF cell unit output measurement, noted out, can be changed to its symmetrical output Q-bar, not drawn here as it is a trivial optional change to the one with common knowledge in the field.

In the embodiment described in FIG. 4 corresponding to an implementation of the system described in FIG. 1, the PUF cell units described in FIG. 2 and FIG. 3 are arranged in an array of a certain number of rows, B, and a certain number of columns, A; A and B being at minimum 1 and as large as desired within a reasonable amount that can effectively deliver a reliable statistical static features while having a reliable dynamic features for true randomness.

Each row of the array of PUF cell units is composed by a number A of PUF cell units. Each PUF cell unit located on this row has its trigger or clock input connected to a common trigger or clock signal, referred as excite B signal, B being the row index. The excite B signal can be described as a pulse or clock signal that will result in having a metastable state result for each PUF cell unit membered of the excited row B. The metastable PUF cell outputs are then collected column by column, which means A number of output results as described in FIG. 4 with Bit result (selected B,A) corresponding to the result of a single pulse excite B. Each row can be excited as much as desired, number of pulse excitement will be referred as X.

In the array of PUF cell units' embodiments described, each row is individually excited X times to obtain a final single row statistical logic states count. Once the defined number of excite pulse X has been reached, the circuit control can proceed to the excitement and measurement count of another index B for another row of array of PUF cell units to measure. In embodiment illustrated in FIG. 4, each excite signal is the combination of a system clock pulse with one excite B signal active at a time noted Clock && excite B, but is not the only method that can be implemented to trigger and measure the PUF cell array unit.

The output bit result of each B column cell is forwarded by a row multiplexer (row MUX) circuit that identifies which row is being currently excited and sent to the states counter circuit via a D Flip Flop cell to stabilize eventual unwanted metastable oscillations. The procedure and order of row index B measured for X times is controlled by the block control circuit.

The final result of the array of PUF cell units' measurements and counts is performed by the states counter circuit and is accumulated through a collector circuit that will map what the control circuit has set up as an excitement procedure and each PUF cell unit results will be either having a value completely bias to 0, completely bias to 1 so X after X excitement, or neither with a certain random counted value named Z.

The array of PUF cell units' count result is therefore an array composed of 0, X and Z, referred as statistical logic outputs array. This statistical logic outputs array result can be used directly as a PUF algorithm unique digital signature recovery input. Indeed, although the result has a certain amount of Z values, these values are for the vast majority, for example 90%, much closer to 0 than X and vice-versa, which means that most of the Z values can be assessed as 0 or X for having a more static PUF source input with a minimum amount or errors to correct or to compute with. Meanwhile these same Z values are a valuable source of random bit generator, because even though closer to X, the exact number Z remains truly random and a certain amount of Least Significant Bit (LSB) from the Z results can be a reliable source of generating random bits. For example, if the number of excite X=256, a Z results equal to 234 will be assessed as closer to X for static features, but the exact same PUF cell unit results after another measurement may be equal to 250 or 237 which gives different random bits to use from the LSBs of Z result while still being assessed as bias to X for the PUF source input.

In the embodiment illustrated in FIG. 4, the control circuit, states counter circuit, collector circuit and random number generator are not restricted to a single form of system integration and can be both integrated as a hardware circuit or a software programmed system, the array of PUF cell units including the D-Flip flop final single bit output being restricted to a hardware implementation target, independently from semiconductor process nodes.

Figure 5:
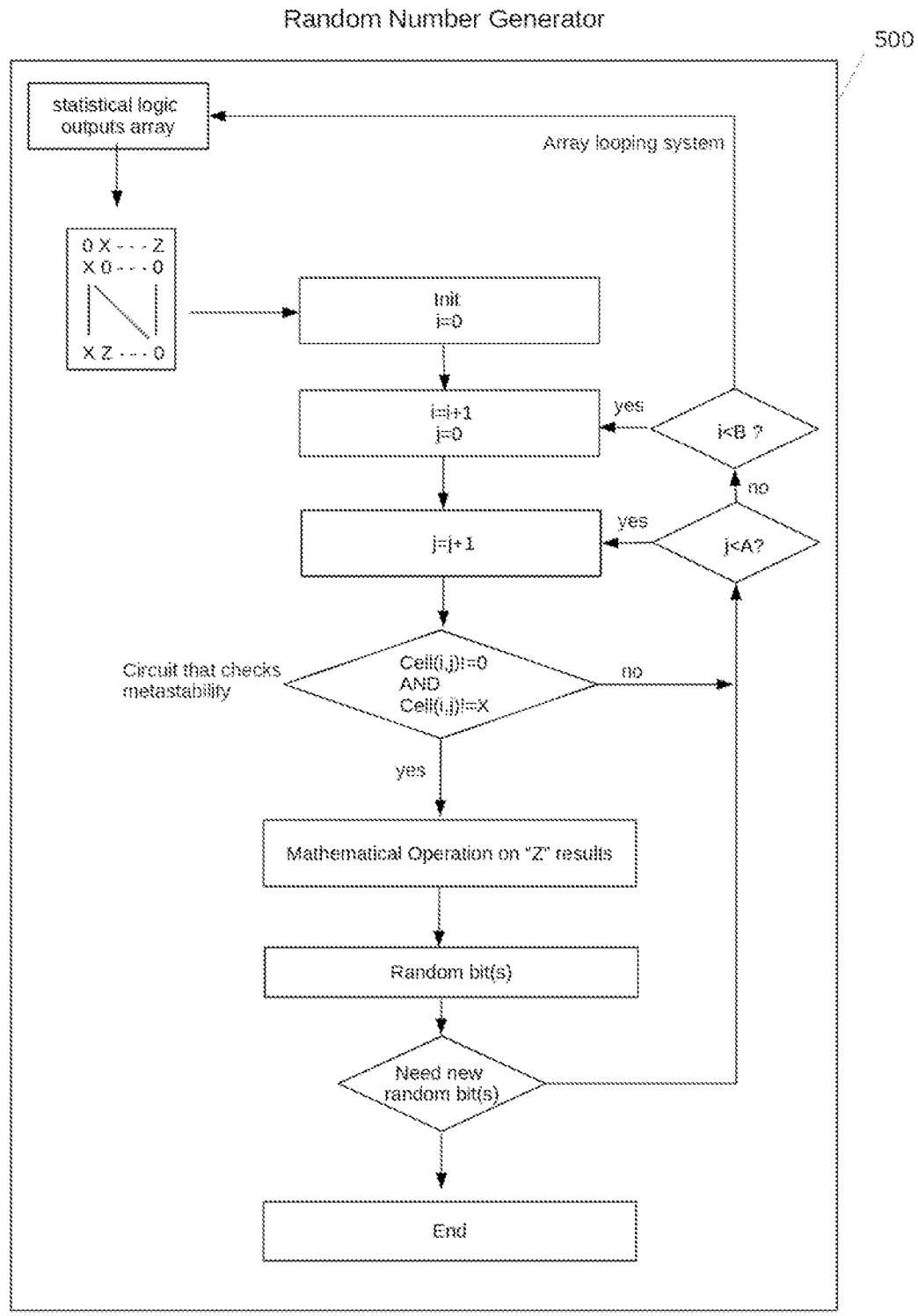
FIG. 5 is a drawing illustrating a process flow to extract random bits from the statistical logic outputs array obtained with the states counter and collector circuits results based on any combinatorial operations on the detected non-static PUF cell units output results according to an embodiment of the present invention.
Figure 6:
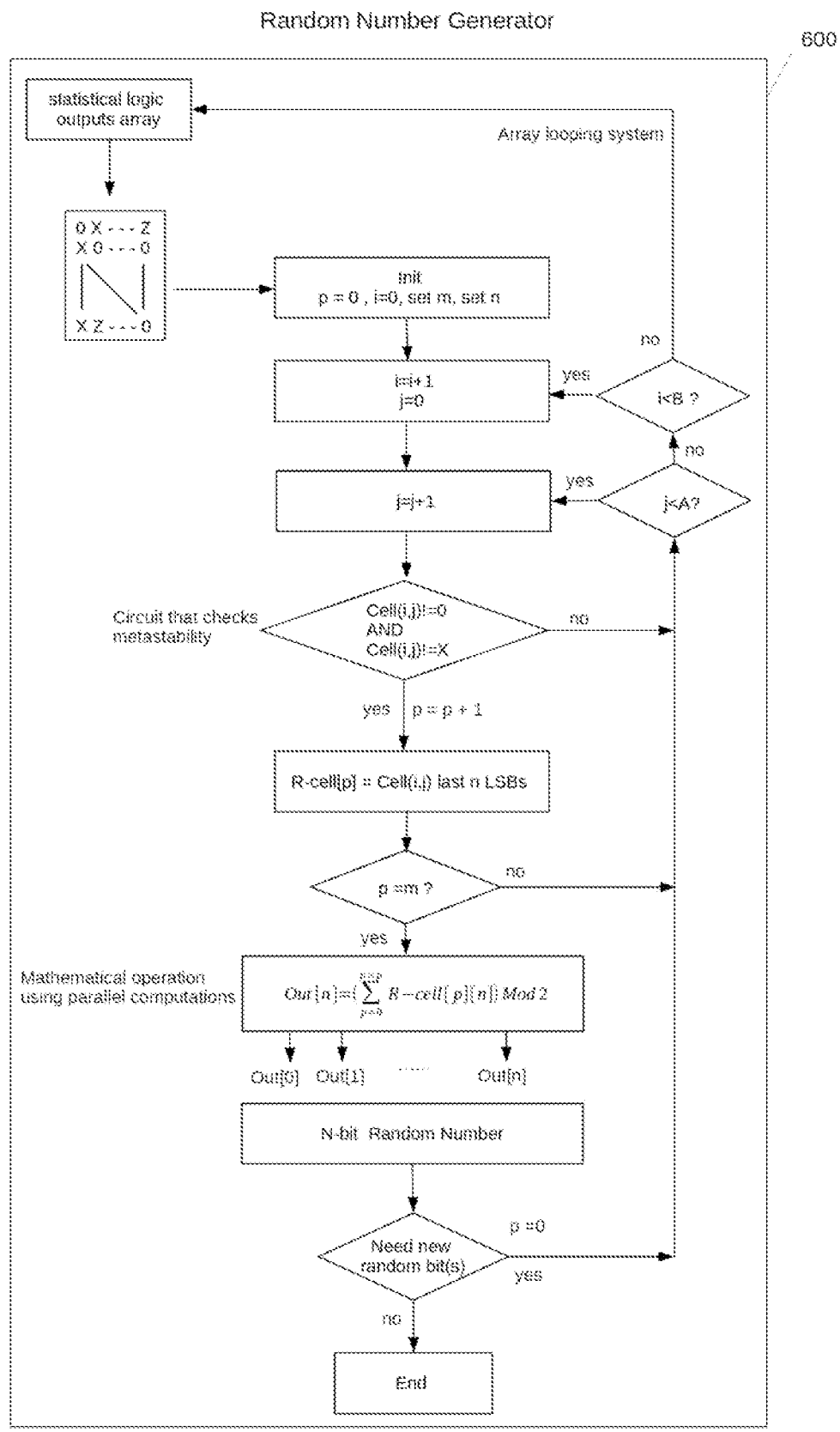
FIG. 6 is a drawing illustrating one particular process and implementation of the general random number generation method in FIG. 5 using an operation on least significant bits of several non-static detected PUF cell units output results according to an embodiment of the present invention.

Refer to FIG. 5, which is a drawing illustrating a process flow 500 to extract random bits from the array of PUF cell units counting results, referred as statistical logic outputs array, based on any combinatorial operations on the detected non-static PUF cell unit results according to an embodiment of the present invention, and to FIG. 6, which is a drawing illustrating one particular process 600 and implementation of the general random number generation method in FIG. 5 using an operation on least significant bits of several non-static detected PUF cell unit results according to an embodiment of the present invention.

In the embodiments illustrated in FIG. 5 and FIG. 6 are procedures and methods to extract random bits from the statistical logic outputs array. FIG. 5 describes a general approach method and FIG. 6 one specific implementation of the general approach.

Since the statistical results of the array of PUF cell units is logic-based and independent from specific power up sequence or voltage bias, but only from an excite pulse signal, it has the advantage of being measurable at any time of the host device operation for various purposes and needs.

The process of measurement of a new PUF source input described by embodiment FIG. 4 is symbolized by the block "statistical logic outputs array" in FIG. 5 and FIG. 6.

From the statistical logic outputs array results composed of vectors with 0, X and Z, the random number generator system will discard all the cell results equal to 0 or X and scan the whole array or certain part of it if the whole array is not necessary.

In FIG. 5 "i" corresponds to the row index to scan, B in FIG. 4, and "j" to the PUF cell unit result column index to evaluate, A in FIG. 4. If the circuit that checks metastability scans a PUF cell unit index to be neither biased to 0 or X but to a certain Z value, a mathematical operation on the 'Z' results accumulated across multiple PUF cell units or not can be made to extract a true random bit. The process is terminated when the targeted number of bits has been created, and a new complete statistical logic outputs array result can be measured again via the array looping system if the required number of random bits has not been reached, symbolized by the block called Need new random bit(s).

In the embodiment illustrated in FIG. 6, is described a method to effectively extract true random bits numbers as one implementation of the embodiment described in FIG. 5.

In this embodiment, the statistical logic outputs array results with 0, X and Z results is scanned PUF cell unit by PUF cell unit using the circuit that checks metastability. A number "m" of Z-PUF cell unit results to accumulate is set, and a number "n" of least significant bits (LSBs) to keep from each of Z-PUF cell unit results is set, n LSBs stored in a vector called R-cell. In the embodiment of FIG. 6, there are "m" number of Z-PUF cell unit results collected from which "n" number of corresponding LSB are kept. Once "m" number of "n" LSBs are collected, a mathematical operation using parallel computations on each "n" LSB index of each "m" Z-cell is performed. The result of this operation is then checked whether it is an odd or even result, which gives the final random bit output. With this process, after extracting "n" LSB from "m" Z-cell, there are "n" random bits output that are produced, noted N-bit Random Number, before continuing the process with the next "m" Z-PUF cell unit results or with a new loop from the array looping system if there is a need for new random bits.

Overall, this method to generate true random number does not need the assistance of pseudo-random number generator to generate an infinite number of random bits because the described array of PUF cell units' results is measurable any time for an infinite number of times. It also means that it can feed the input of a PUF retrieval algorithm an infinite number of times as well, removing the eventual need to save or keep a one-time measured array of PUF cell units' results as it is required in the majority of memory-based PUF cell array that have to use the assistance of pseudo-random number generator in order to be able to deliver infinite random numbers based on a single true random seeding from their PUF cell unit's sources.

The above embodiments are only used to illustrate the overall, this method to generate true random number does not need the assistance of pseudo-random number generator to generate an infinite number of random bits because the described array of PUF cell units is measurable any time for an infinite number of times. It also means that it can be the PUF source input of a PUF retrieval algorithm an infinite number of times as well, technical implementations of the present invention and not to limit them.

The present invention provides an electronic system to create a digital input exhibiting both static and dynamic mathematical entropy to feed both at once a physically unclonable function (PUF) system and a true random number generator system, comprising a control circuit comprising digital logic gates to interconnect sequentially and in parallel different blocks constituting the electronic system and to interface the electronic system with external electronics devices or systems; an array of PUF cell units that are designed to be symmetrically balanced designed butterfly RS-latches using standard gates, configured in a combinatorial loop mode for ensuring metastability, the array of PUF cell units comprising: a number of rows and columns, each row connecting together common set/reset input of each PUF cell unit member of this row where each PUF cell unit has equal probability after manufacturing to output a logic high or low upon a trigger signal; a row multiplexer circuit, one per column of the array of PUF cell units, that selects a current triggered row from the array of PUF cell units and forward the output logic levels of each PUF cell unit target by a row selection mechanism using a row multiplexer to D-Flip Flop gates circuits; a D-Flip Flop circuit, one per column of the array of PUF cell units, that collects each PUF cell unit result from a single row; a states counter circuit for recording and counting each PUF cells unit logic state result after each triggered metastable output, the counting results of the array of PUF cell units is collected row by row; a collector circuit for recording and accumulating the entire array of PUF cell units results after the states counter circuit and providing final PUF source input that is used as an input entropy source of a random number generator and a physically unclonable function engine in order to extract both a fixed digital fingerprint sequence and random numbers upon the control circuit requests independently from current usage or power cycle of the electronics system; and the random number generator for using detected metastable PUF cells unit results and using a certain amount of corresponding LSBs results to create true random bits.

In an embodiment of the present invention each PUF cell unit design is selected from standard butterfly RS-latch designs using NAND or NOR gates with set and reset signals connected together to achieve metastability by activating a race condition on butterfly cross-path, where each triggered PUF cell unit logic output is further used to form a statistical logic levels counts array.

In an embodiment of the present invention each PUF cell unit uses additional buffers in between each NAND or NOR gate and the respective outputs to achieve a certain metastability and enhance the load circuit symmetry as well as the balance between Q and Q-bar, where each triggered PUF cell unit logic output is further used to form a statistical logic levels counts array.

In an embodiment of the present invention each PUF cell unit uses additional buffers inverter in between each NAND or NOR gates and the respective outputs to achieve a certain metastability and enhance the load circuit symmetry as well as the balance between Q and Q-bar, where each triggered PUF cell unit logic output is further used to form a statistical logic levels counts array.

In an embodiment of the present invention each PUF cell unit output is the RS-latch non-inverted output to perform the same functions as the PUF cell unit.

In an embodiment of the present invention each PUF cell unit output is the RS-latch inverted output to perform the same functions as the PUF cell unit.

In an embodiment of the present invention each PUF cell unit is designed in a semiconductor layout using reflection symmetry in terms of width, length, parasitic and layout layers in-use according to the RS-latch butterfly cross path reference line axis in order to obtain a symmetrically balanced PUF cell unit design to achieve output metastability with as close as possible to equal probability to output a logic high or low upon trigger input signal.

In an embodiment of the present invention the array of PUF cell units is a composite of multiple PUF cell units arranged by a certain number of rows on which each PUF cell unit input trigger are connected together to a common row-attached input trigger, and a certain number of columns defining the number PUF cell units per row, where the PUF cells array constitutes a combination of PUF cells units to form the array of cells that are individually evaluated and measured to obtain a final digital array output result of the same matrices dimension.

In an embodiment of the present invention the array of PUF cell units has a minimum number of rows and columns of 1 and an unlimited respective maximum.

In an embodiment of the present invention the control circuit manages the input triggers signals for each row of the array of PUF cell units one at a time and manages parameters to select the number of measurements to conduct on a single row and to select which row to measure according to a predefined sequence or an external controlled one.

In an embodiment of the present invention each triggered row of the array of PUF cell units is selected by a row multiplexer circuit to transfer the targeted row results for each column and having all rows triggers and global clock values as selective inputs.

The present invention further provides a system that produces a statistical logic outputs array result whose result serves as both input to a random number generator system and PUF system engine to extract a static digital pattern comprising: a states counter circuit for each of its clocked input, accumulating counts of logic high PUF cell units output from the targeted triggered row of the array of PUF cell units; and a collector circuit that collects each states counter circuit final vector output and reproduces an entire statistical logic outputs array result row by row from the array of PUF cell units, and from which all accumulated row results constitute the final vector of counted PUF cells units' logic outputs unique to every different silicon chip system manufactured.

In an embodiment of the present invention the output of a row multiplexer circuit output is buffered and transferred via a D-flip flop circuit for the states counter circuit in order to forward the target PUF cell unit column/row result to the counter.

In an embodiment of the present invention the states counter circuit output result is requested and controlled by the collector circuit that is in charge of creating the final statistical logic outputs array unique to every different silicon chip system manufactured and not consecutively identical.

In an embodiment of the present invention the collector circuit accumulates and buffers each row results of the array of PUF cell units according to a control circuit.

In an embodiment of the present invention the collector circuit outputs a statistical logic outputs array that can be used directly without any data processing as a PUF algorithm fixed digital sequence recovery for certain implementation of the PUF cell units' embodiment exhibiting adequate static entropy for target system application.

In an embodiment of the present invention the collector circuit outputs a result of statistical states counts of the array of PUF cell units to a random number generator engine that will process the results in order to extract a certain amount of true random bits.

The present invention further provides a system that produces a true random number composed of accumulated true random extracted bits comprising: an array looping system to check each value of an array in order to filter usable metastable counted values from a single PUF cell unit for true random bits generation; a circuit that check the metastability characteristics of a value and filter usable metastable counted values from each PUF cell unit for true random bits generation; an LSB selector that keeps a certain number of low significant bits from the selected metastable count results of a PUF cell unit by the circuit checking the related metastability in order to discard as much static part as possible from two consecutive count results of the same PUF cell unit and the next loop managed by the array looping system; and a mathematical operation circuit which uses a certain accumulated number of least significant bits to perform logic combinations in order to output a final vector of random bits.

In an embodiment of the present invention the circuitry that checks metastability has manually defined threshold values to assess metastability and select or discard a PUF cell unit count result as adequate to have its low significant bits selected for true random bits generation.

In an embodiment of the present invention the LSB selector can select any pre-defined number of least significant bits from the metastable detected value.

The present invention further provides an apparatus comprising: an array looping system to check each value of an array and evaluate if the value is suitable for true random bit generation according to a defined threshold; a circuit that checks the metastability characteristics of a value and performs the target evaluation within the looping system; an LSB selector to ensure adequate selection of random bits from multiple consecutive logic levels count of the same PUF cell unit; and a mathematical operation circuit taking the selected number of LSBs as input to perform combinatorial logic for the purpose of extracting one or multiple true random bits.

In an embodiment of the present invention the mathematical operation uses parallel computations on defined number of metastable bits to extract the same defined number of random bits.

Although the present invention has been described in detail with reference to the preferred embodiments, those of ordinary skill in the art should understand that the technical solutions of the present invention can be modified or modified. Equivalent replacement without departing from the spirit and scope of the technical solution of the present invention.

What is claimed is:

1. An electronic system to create a digital PUF source input exhibiting both static and dynamic mathematical entropy to feed both at once a physically unclonable function (PUF) system and a true random number generator system, comprising:
   a control circuit comprising digital logic gates to interconnect sequentially and in parallel different blocks constituting the electronic system and to interface the electronic system with external electronics devices or systems;
   an array of PUF cell units that are designed to be symmetrically balanced designed butterfly set reset latches (RS-latches) using standard gates, configured in a combinatorial loop mode for ensuring metastability, the array of PUF cell units comprising:
   a number of rows and columns, each row connecting together common set/reset input of each PUF cell unit member of this row where each PUF cell unit has equal probability after manufacturing to output a logic high or low upon a trigger signal;
   a row multiplexer circuit, one per PUF cells array column, acting as a row selection mechanism, that through a trigger mechanism selects a current triggered row from the array of PUF cell unit and forward output logic levels of each PUF cell unit targets to D-Flip Flop gates circuits;
   a D-Flip Flop circuit, one per column from the array of PUF cell units, that collects each PUF cell unit result from a single row;
   a states counter circuit for recording and counting each PUF cell unit result after each triggered metastable output, where the states counting results are collected row by row;
   a collector circuit for recording and accumulating an entire statistical result of the array of PUF cell units and providing final statistical PUF source input that is used as an input entropy source of a random number generator and a physically unclonable function engine in order to extract both a fixed digital fingerprint sequence and random numbers upon the control circuit requests independently from current usage or power cycle of the electronics system; and
   the random number generator for using detected metastable PUF cells unit results and using a certain amount of corresponding LSBs results to create true random bits forming true random numbers.

2. The system of claim 1, where each PUF cell unit design is selected from standard butterfly RS-latch designs using NAND or NOR gates with set and reset signals connected together to achieve metastability by activating a race condition on butterfly cross-path, where each triggered PUF cell unit logic output is further used to form a statistical logic outputs array.

3. The system of claim 2, where each PUF cell unit uses additional buffers in between each NAND or NOR gate and the respective outputs to achieve a certain metastability, where each triggered PUF cell unit logic output is further used to form a statistical logic outputs array.

4. The system of claim 2, where each PUF cell unit uses additional buffers inverter in between each NAND or NOR gates and the respective outputs to achieve a certain metastability, where each triggered PUF cell unit logic output is further used to form a statistical logic outputs array.

5. The system of claim 2, where each PUF cell unit output is the RS-latch non-inverted output to perform the same functions as the PUF cell unit.

6. The system of claim 2, where each PUF cell unit output is the RS-latch inverted output to perform the same functions as the PUF cell unit.

7. The system of claim 1, where each PUF cell unit is designed in a semiconductor layout using reflection symmetry in terms of width, length, parasitic and layout layers in-use according to the RS-latch butterfly cross path reference line axis in order to obtain a symmetrically balanced PUF cell unit design to achieve output metastability with as close as possible to equal probability to output a logic high or low upon trigger input signal.

8. The system of claim 1, where the array of PUF cell units is a composite of multiple PUF cell units arranged by a certain number of rows on which each PUF cell unit input trigger are connected together to a common row-attached input trigger, and a certain number of columns defining the number PUF cell units per row, where the array of PUF cell units constitutes a combination of PUF cell units to form the array of cells that are individually evaluated and measured to obtain a final digital array output result of the same matrices dimension.

9. The system of claim 1, where the array of PUF cell units has a minimum number of rows and columns of 1 and an unlimited respective maximum.

10. The system of claim 1, where the control circuit manages input triggers of each row of the array of PUF cell units one at a time and manages parameters to select number of measurements to conduct for one row and to select which row to measure according to a predefined sequence or an external controlled one.

11. The system of claim 10, where each row of the array of PUF cell units is selected by a row multiplexer circuit to transfer a correct row result of a measured column and having all rows triggers and global clock value as selective input.

12. A system that produces a PUF source input whose result serves as both input to a random number generator system and PUF system engine to extract a static digital pattern comprising:
 a states counter circuit for each of its clocked input, accumulating counts of logic high PUF cell units output from targeted triggered row of parallel PUF cells units; and
 a collector circuit that collects each states counter circuit final vector output and reproduces an entire count results from the trigger mechanism of an array of PUF cell units row by row, and from which all accumulated row results constitute the final vector of statistical logic outputs array unique to every different silicon chip system manufactured.

13. The system of claim 12 where output of a row multiplexer circuit output is buffered and transferred via a D-flip flop circuit for the states counter circuit in order to forward the targeted PUF cell unit column/row result to the states counter circuitry.

14. The system of claim 12, where the states counter circuit output result is requested and controlled by the collector circuit that is in charge of creating the final statistical logic outputs array unique to every different silicon chip system manufactured and not consecutively identical.

15. The system of claim 12, where the collector circuit accumulates and buffers each row from the array of PUF cells units according to a control circuit.

16. The system of claim 12, where the collector circuit statistical logic outputs array can be used directly without any data processing as a PUF algorithm fixed digital sequence recovery for certain implementation of the PUF cell units embodiment exhibiting adequate static entropy for target system application.

17. The system of claim 12, where the collector circuit outputs a statistical logic outputs array to a random number generator engine that will process the results in order to extract a certain amount of true random bits.

18. A system that produces a true random number composed of accumulated true random extracted bits comprising:
 an array looping system to check each value of an array in order to filter usable metastable counted values from a single PUF cell unit for true random bits generation;
 a circuit that checks the metastability characteristics of a value and filter usable metastable counted values from each PUF unit cell for true random bits generation;
 an LSB selector that keeps a certain number of low significant bits from an extractor of oscillating cells metastable count result of a PUF cell unit count by the circuit checking the related metastability in order to discard as much static part as possible from two consecutive count result of the same PUF cell unit and the next loop managed by the array looping system; and
 a mathematical operation circuit which uses a certain accumulated number of least significant bits to perform LSBs logic combinations in order to output a final vector of random bits.

19. The system of claim 18, where circuitry that checks metastability has a manually defined threshold values to assess metastability and select or discard a PUF cell unit logic outputs count as adequate to have its low significant bits selected for true random bits generation.

20. The system of claim 18, where the LSB selector can select any pre-defined number of least significant bits from the metastable detected value.

21. An apparatus comprising:
 an array looping system to check each value of an array and evaluate if the value is suitable for true random bit generation according to a defined threshold;
 a circuit that checks the metastability characteristics of a value and performs the target evaluation within the looping system;
 an LSB selector to ensure adequate selection of random bits from multiple consecutive logic outputs count of the same PUF cell unit by an extractor of oscillating cells; and
 a mathematical operation circuit taking the selected LSBs as input to perform LSBs logic combination for the purpose of extracting one or multiple true random bits.

22. The apparatus of claim 21, where the mathematical operation uses parallel computations on defined number of metastable bits to extract the same defined number of random bits.

* * * * *